Patented Aug. 17, 1948

2,447,019

UNITED STATES PATENT OFFICE 2,447,019

PREPARATION OF DIAMINOCRESOL

John Krueger and Robert Lenhart Hayes, Chicago, Ill., assignors to The Edwal Laboratories, Inc., Chicago, Ill., a corporation of Illinois No Drawing. Application December 8, 1943, Serial No. 513,462

7 Claims. (Cl. 260—575)

Our invention relates to the preparation of a novel diaminocresol in which the hydroxy and amino groups are symmetrically arranged on the toluene nucleus and is particularly concerned with a new and useful and highly efficacious method for the production thereof.

We have found, in accordance with our present invention, that symmetrical triaminotoluene hydrochlorides may be converted by step-wise hydrolysis into diaminocresol hydrochloride and the latter may be treated, as hereinafter described, to produce the hitherto unknown diaminocresol base. The latter may be recovered as a crystalline material which, in the pure form, is present as white needles melting at approximately 235 degrees C. The properties and characteristics of diaminocresol base indicate its usefulness in the preparation of pharmaceuticals; as dye and resin intermediates; as anti-oxidants for oleaginous materials, rubber, and the like; in the photographic industry; and as an intermediate for the synthesis of various organic compounds.

In general, our method comprises hydrolyzing a triaminotoluene hydrochloride (which may be a monohydrochloride, a dihydrochloride, a trihydrochloride, or mixtures thereof, or the hydrates of such hydrochlorides) in an aqueous medium at somewhat elevated temperatures, particularly at approximately the boiling point of the solution and preferably at not less than about 60 degrees C. In its particularly preferred embodiment, the hydrolysis is conducted in an aqueous weakly acid medium. While acids generally may be used, we prefer particularly to employ hydrochloric acid and, for best results, it should be used in approximately 3% to 8% solution, preferably approximately 5%.

After the hydrolysis has been completed to the extent desired, which, as indicated hereinabove, results substantially in the conversion of only one of the amino groups of the triaminotoluene to an hydroxy group, the hydrolysate is cooled, for example, to room temperature or slightly below, and hydrochloric acid is added thereto, preferably in the form of gaseous hydrochloric acid, sufficient hydrochloric acid being added to precipitate the diaminocresol in the form of its dihydrochloride salt.

The resulting precipitate of diaminocresol dihydrochloride, after separation by filtration or the like, is then treated to recover the free diaminocresol base. This is very effectively accomplished by admixing the diaminocresol dihydrochloride with a strong aqueous solution of an alkali carbonate. The resulting precipitate, which contains the free diaminocresol base, may be extracted with an organic solvent, for example, methanol, acetone, or the like. The free diaminocresol base may then be recovered from the organic solvent by crystallization or by evaporation of the solvent. In place of the alkali carbonates, alkalies or alkaline materials generally may be utilized, but we have found that the alkali carbonates, particularly the alkali metal carbonates, and especially sodium carbonate, are unusually satisfactory and we make particular claim to the use thereof as an important, though limited, embodiment of our invention.

In order that those skilled in the art may more fully understand the nature of the present invention, the following example is set forth as illustrative. It will be understood that the proportions of reacting ingredients, times of reaction, and the like, may be varied. These and other variations and modifications will be evident to those skilled in the art in the light of the guiding principles which are disclosed herein.

*Example*

9 grams of triaminotoluene trihydrochloride, were refluxed in 20 cc. of 5% hydrochloric acid for two hours. The reaction mixture was then cooled to room temperature and saturated with gaseous hydrochloric acid. The resulting precipitate, which comprised essentially diaminocresol dihydrochloride, was removed and added to 40 cc. of 20% sodium carbonate solution. The precipitate which resulted was filtered off and extracted with boiling methanol. Upon cooling, diaminocresol base crystallized from the methanol as substantially white needles having a melting point of 225 degrees C. On rerystallization from methanol, substantially pure diaminocresol base was recovered in the form of white needles having a melting point of 235 degrees C.

Where, in place of triaminotoluene trihydrochloride, the mono- or di-hydrochloride is used, the amount of hydrochloric acid employed in the refluxing step is preferably correspondingly increased.

While we have described our invention in detail it will be understood that the scope thereof is not to be limited other than as set forth in the claims.

What we claim as new and desire to protect by Letters Patent of the United States is:

1. In a method of preparing diaminocresol base, the steps which comprise hydrolyzing a symmetrical triaminotoluene hydrochloride in an aqueous-hydrochloric acid medium until only one of the amino groups of the triaminotoluene is converted to a hydroxy group, cooling, adding hydrochloric acid, admixing the resulting precipitate with a solution of an alkali metal carbonate, filtering, extracting the diaminocresol base from the precipitate with an organic solvent, and recovering the diamino cresol base from said organic solvent.

2. In a method of preparing diaminocresol base, the steps which comprise hydrolyzing a symmetrical triaminotoluene hydrochloride in an aqueous-hydrochloric acid medium until only one of the amino groups of the triaminotoluene is converted to a hydroxy group, cooling, adding gaseous hydrohloric acid to substantially saturate the solution, admixing the resulting precipitate with a solution of sodium carbonate, filtering, extracting the diaminocresol base from the precipitate with an organic solvent, and recovering the diaminocresol base from said organic solvent.

3. In a method of preparing diaminocresol base, the steps which comprise hydrolyzing a symmetrial triaminotoluene hydrochloride in an aqueous acid medium until only one of the amino groups of the triaminotoluene is converted to a hydroxy group, cooling, precipitating diaminocresol dihydrochloride by adding hydrochloric acid, adding the resulting precipitate to a solution of an alkali metal carbonate, filtering, extracting the diaminocresol base from the precipitate with an organic solvent, and recovering the diaminocresol base from said organic solvent.

4. In a method of preparing diaminocresol base, the steps which comprise hydrolyzing a symmetrical triamino-toluene hydrochloride in an aqueous acid medium until only one of the amino groups of the triaminotoluene is converted to a hydroxy group, cooling, precipitating diaminocresol dihydrochloride by adding hydrochloric acid, admixing the resulting precipitate with a solution of sodium carbonate, filtering, extracting the diaminocresol base from the precipitate with an organic solvent, and recovering the diaminocresol base from said organic solvent.

5. In a method of preparing diaminocresol base, the steps which comprise hydrolyzing a symmetrical triaminotoluene hydrochloride in an aqueous medium until only one of the amino groups of the triaminotoluene is converted to a hydroxy group, cooling, adding hydrochloric acid thereto, filtering off the resulting precipitate, adding it to a solution of an alkali metal carbonate, and extracting the diaminocresol base from the resulting precipitate with an organic solvent.

6. In a method of preparing diaminocresol, the steps which comprise refluxing a symmetrical triaminotoluene hydrochloride with aqueous-hydrochloric acid until only one of the amino groups of the triaminotoluene is converted to a hydroxy group, cooling, and adding hydrochloric acid thereto to precipitate diaminocresol dihydrochloride.

7. In a method of preparing diaminocresol base, the steps which comprise refluxing a symmetrical triaminotoluene hydrochloride with aqueous-hydrochloric acid until only one of the amino groups of the triaminotoluene is converted to a hydroxy group, cooling, adding gaseous hydrochloric acid thereto, filtering off the resulting precipitate, and adding an alkali thereto to free the diaminocresol base.

JOHN KRUEGER.
ROBERT LENHART HAYES.

REFERENCES CITED

The following references are of record in the file of this patent.

UNITED STATES PATENTS

| Number | Name | Date |
|---|---|---|
| 1,492,094 | Bielouss | Apr. 29, 1924 |

OTHER REFERENCES

Beilstein Handbuch der Org. Chem., vol. XIII, (4th ed.), pages 588, 597; (supplement to vol. XIII), page 230.